United States Patent [19]
Sugiura

[11] Patent Number: 5,719,452
[45] Date of Patent: Feb. 17, 1998

[54] HYBRID-TYPE STEPPING MOTOR

[75] Inventor: Tsuneo Sugiura, Iida, Japan

[73] Assignee: Tamagawa Seiki Kabushiki Kaisha, Nagano-ken, Japan

[21] Appl. No.: 680,813

[22] Filed: Jul. 16, 1996

[30] Foreign Application Priority Data

Apr. 5, 1996 [JP] Japan .................. 8-084084

[51] Int. Cl.[6] .................. H02K 37/02; H02K 37/10; H02K 1/22
[52] U.S. Cl. .................. 310/49 R; 310/268
[58] Field of Search .................. 310/49 R, 164, 310/181, 268, 254

[56] References Cited

U.S. PATENT DOCUMENTS

| | | | |
|---|---|---|---|
| 1,440,729 | 1/1923 | French | 310/49 R |
| 3,418,506 | 12/1968 | Parker | 310/268 |
| 3,509,390 | 4/1970 | Loughlin et al. | 310/49 R |
| 3,806,744 | 4/1974 | Abraham et al. | 310/49 R |
| 4,306,164 | 12/1981 | Itoh et al. | 310/49 R |

FOREIGN PATENT DOCUMENTS

| | | | |
|---|---|---|---|
| 3425266 | 2/1985 | Germany | 310/49 R |
| 2052175 | 1/1981 | United Kingdom | 310/49 R |

*Primary Examiner*—Clayton E. LaBalle
*Attorney, Agent, or Firm*—Sughrue, Mion, Zinn, Macpeak & Seas, PLLC

[57] ABSTRACT

A hybrid-type stepping motor has coils on stator yokes mounted on a fixed shaft or coils wound on the inner circumferences of stator yokes. This hybrid-type stepping motor is easy to coil wind, offers a substantially high density of coils, and achieves a reduction in cost. The use of sub flat magnets and sub magnetic plates on both sides of a stator yoke body allows magnetic circuits to form on both sides of the stator yoke body. This arrangement results in an increase in torque. Additionally, multiple-phase motor is easily constructed.

8 Claims, 11 Drawing Sheets (2 PHASE TYPE)

5,719,452

HYBRID-TYPE STEPPING MOTOR

BACKGROUND OF THE INVENTION

1. Field of the Invention

The present invention relates to a hybrid-type stepping motor, and more specifically, to new improvements of the hybrid-type stepping motor which facilitate the winding and placement of coils, permit a high density of coils to achieve a high efficiency and low cost construction, and permit driving at any arbitrary number of phases, such as two-phase, three-phase and five-phase driving.

2. Description of the Related Art

As shown in FIG. 1, the prior art hybrid-motor has a rotary shaft 1 rotatably supported at a pair of bearings 2, 3 secured on both ends of a casing 4. A generally ring-shaped stator yoke 6 having a stator coil 5 is mounted on the inner surface 4a of the stator casing 4. A plurality of stator teeth 7 are spaced regular intervals apart circumferentially around the inner circumference of the stator yoke 6. Disposed between the bearings 2, 3 are ring-shaped first and second rotor yokes 9, 10 which are arranged in a unitary body on the rotary shaft with a flat magnet 8 therebetween. Each of the rotor yokes 9, 10 has on its circumference, rotor teeth 9a, 10a, and the rotor yokes 9, 10 alternate with each other in polarity. By supplying a driving pulse from an unshown driving circuit to the stator coil 5, the rotor yokes 9, 10 rotate stepwise.

The prior art hybrid-type stepping motor thus constructed has the following problems.

In the hybrid-type stepping motor having the rotor yokes having the flat magnet interposed therebetween, the stator coil wound around each tooth of the stator yoke is positioned inside the casing. Coil winding to each tooth is difficult, and increasing the density of coil is also difficult. When a plurality of motors are coupled to achieve a larger torque, the longitudinal dimension of the shaft becomes too long. This arrangement makes coil winding even more difficult.

In the prior art hybrid-type stepping motor, each of the two-phase, three-phase, five-phase motors needs its own appropriate stator cores.

SUMMARY OF THE INVENTION

The present invention has been developed to solve the above problems, and it is an object of the present invention to provide a low-cost hybrid-type stepping motor, in which the winding and placement of coils are facilitated, the density of coils is increased to give a high efficiency, a two-phase, three-phase, five-phase, and n-phase motor are fabricated, if necessary, using identical stator yokes and rotor yokes, torque is increased by the structure in which a flat magnet provides a strong excitation, and if necessary, N of the n-phase motors are advantageously cascaded along a single shaft.

One embodiment of the hybrid-type stepping motor according to the present invention is outer-rotor structured, and comprises a pair of bearings spaced apart and provided on a fixed shaft, a rotor case rotatably supported by the bearings, a ring-shaped rotor yoke, mounted on the rotor case, having a plurality of rotor teeth, a stator yoke body made up of n pieces of stator yokes arranged on the fixed shaft, side by side with flat magnets interposed therebetween on the fixed shaft along the direction of the fixed shaft, a plurality of stator teeth formed on the circumference of each stator yoke, n pieces of axially centered circular coil slots formed on the circumferences of the stator yokes, n pieces of coils seated at the circular coil slots, and a pair of sub magnetic plates mounted to the fixed shaft in a manner that the stator yoke body is interposed between sub flat magnets which are interposed between the pair of sub magnetic plates, whereby the stator yokes alternate in magnetic polarity and magnetic flux flows from the sub flat magnets to the sub magnetic plates.

More specifically, the hybrid-type stepping motor of the present invention may comprise three yokes for three-phase driving.

More specifically, the hybrid-type stepping motor of the present invention may comprise two yokes for two-phase driving.

Another embodiment of the hybrid-type stepping motor according to the present invention is inner-outer rotor structured, and comprises a pair of bearings provided on both ends of a casing, a rotary shaft rotatably supported by the bearings, a stator yoke body made up of n pieces of ring-shaped stator yokes arranged side by side with ring-shaped flat magnets interposed therebetween in the inner circumference of the casing along the direction of the rotary shaft, a plurality of stator teeth formed on the inner circumferences of the ring-shaped stator yokes, a pair of sub magnetic plates mounted in the casing in a manner that the stator yoke body is interposed between sub flat magnets which are interposed between the pair of sub magnetic plates, n pieces of axially centered circular coil slots formed on the inner circumferences of the ring-shaped stator yokes, n pieces of coils seated at the circular coil slots, a rotor yoke mounted on the rotary shaft corresponding to the stator yokes, and a plurality of rotor teeth provided on the circumference of the rotor yoke, whereby magnetic flux flows from the sub flat magnets to the sub magnetic plates.

More specifically, the hybrid-type stepping motor of this embodiment of the present invention may have three yokes for three-phase driving.

More specifically, the hybrid-type stepping motor of this embodiment of the present invention may have two yokes for two-phase driving.

More specifically, the hybrid-type stepping motor of this embodiment of the present invention can be outer-rotor structured such that N pieces of stator yoke bodies with the flat magnets interposed therebetween are cascaded.

More specifically, the hybrid-type stepping motor of this embodiment of the present invention can be inner-rotor structured such that N pieces of stator yoke bodies with the flat magnets interposed therebetween are cascaded.

DETAILED DESCRIPTION OF THE PREFERRED EMBODIMENTS

Figure 1:
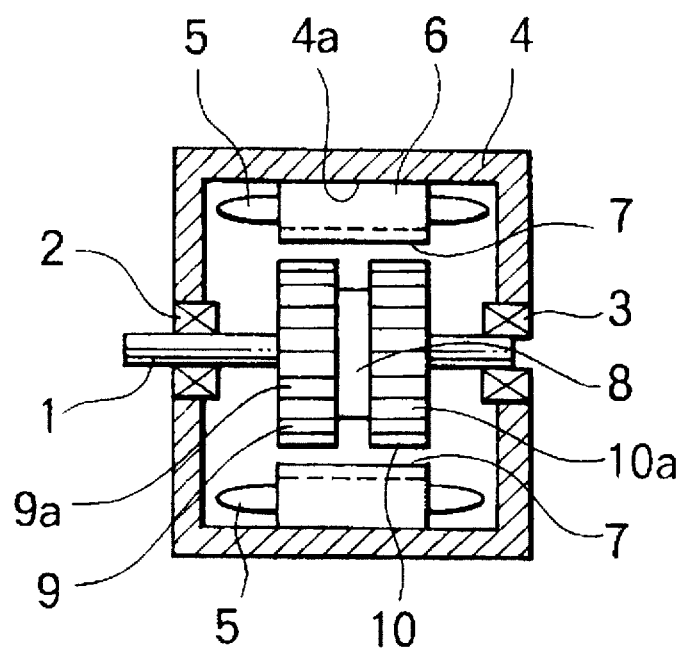
FIG. 1 is the cross-sectional view showing the prior art structure.

Referring to the drawings, the embodiments of the hybrid-type stepping motor of the present invention will now be discussed. Components identical or equivalent to those discussed with reference to the prior art are designated with the same reference numerals.

Figure 2:
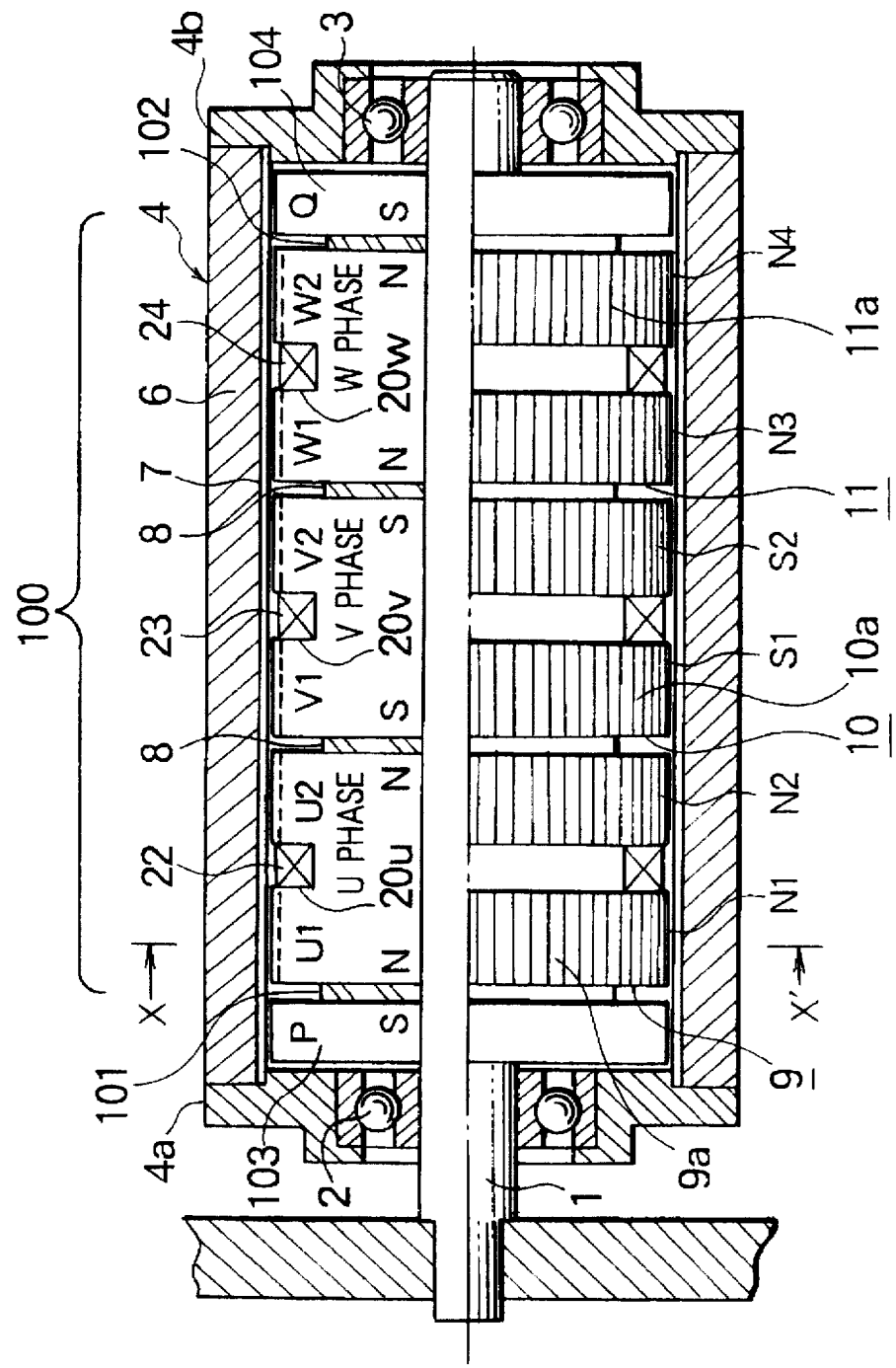
FIG. 2 is a cross-sectional view showing the three-phase hybrid-stepping motor of the present invention.
Figure 3:
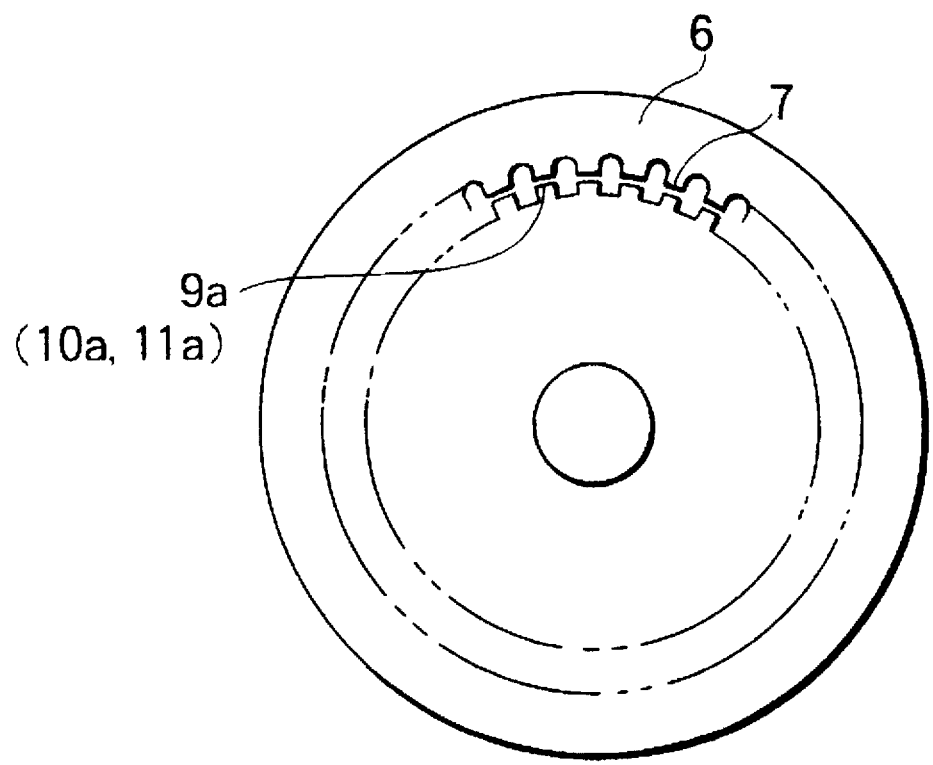
FIG. 3 is a transverse cross-sectional view taken along X-X' in FIG. 2.

FIG. 2 shows an outer-rotor structured hybrid-type stepping motor. Designated 1 is a fixed shaft of a non-magnetic material on which a pair of bearings 2, 3 spaced apart from each other are mounted. A rotor case 4 constructed of a front end cover 4a, a rear end cover 4b and a cylindrical rotor yoke 6 is rotatably supported at the bearings 3, 4. A plurality of rotor teeth 7 are mounted on the inner circumference of the rotor yoke 6 of the rotor case 4.

First, second and third ring-shaped stator yokes 9, 10, 11 arranged with flat magnets 8 therebetween side by side on the fixed shaft 1 in the direction of the fixed shaft are structured in a unitary body including the flat magnets 8, and first, second and third axially centered circular coil slots 20u, 20v, and 20w are formed on the circumferences of the stator yokes 9, 10, and 11. The stator yokes 9 through 11 constitute a stator yoke body 100, sub flat magnets 101, 102 are secured on the fixed shaft 1, to both ends of the stator yoke body 100, respectively, and first and second sub magnetic plates 103, 104 are secured on the fixed shaft 1, to the sub flat magnets 101, 102, respectively. Seated in the coil slots 20u, 20v, and 20w are a first coil 22 for phase U, a second coil 23 for phase V, and a third coil 24 for phase W, each wound in a solenoid fashion (the coils 22, 23, 24 are automatically wound by a coil winding machine). The first stator yoke 9 has, on its circumference, first and second N poles N1 and N2, between which the first coil 22 is interposed, the second stator yoke 10 has, on its circumference, first and second S poles S1 and S2, between which the second coil 23 is interposed, and the third stator yoke 11 has, on its circumference, third and fourth N poles N3 and N4, between which the third coil 24 is interposed, and the rotor teeth 7 correspond to each of the poles N1, N2, S1, S2, N3, and N4, and the poles N1, N2, S1, S2, N3, and N4 have, on their circumferences, a plurality of stator teeth 9a, 10a, and 11a having the same pitch as that of the rotor teeth 7. As shown in the explanatory diagram in FIG. 8, the stator teeth 9a, 10a and 11a are structured so that the poles N1 and N2 are shifted off by a ½ pitch (1π) with each other. The poles S1 and S2 are shifted off by a ½ pitch (1π) with each other. The poles N3 and N4 are shifted off by a ½ pitch (1π) with each other. The stator teeth 9a, 10a and 11a are structured so that the poles N1 and N2, the poles S1 and S2, and the poles N3 and N4 are shifted off by ⅙ pitch (π/3) (½n pitch, n: number of phases), respectively. The sub magnetic plates 103 and 104 are used only to form magnetic flux paths.

Figure 4:
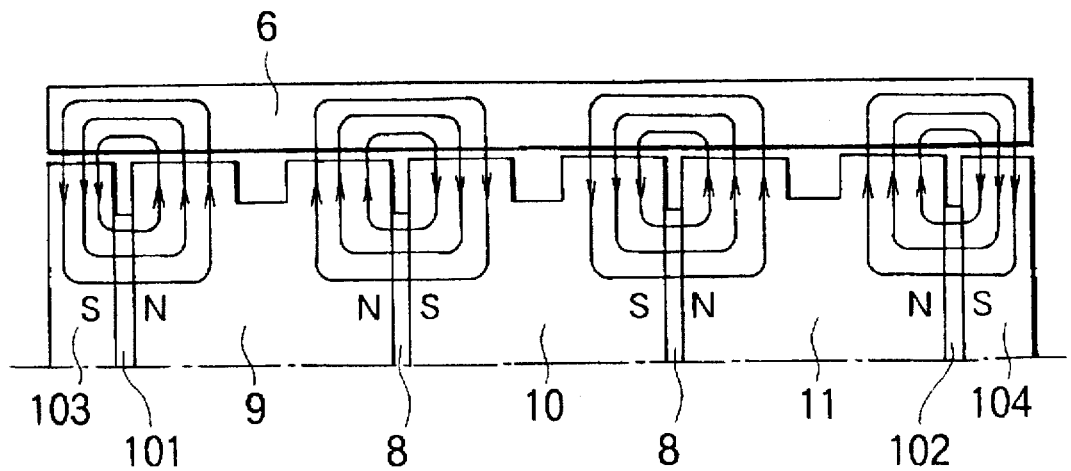
FIG. 4 is an explanatory diagram showing the flows of the magnetic fluxes generated by the flat magnets.
Figure 5:
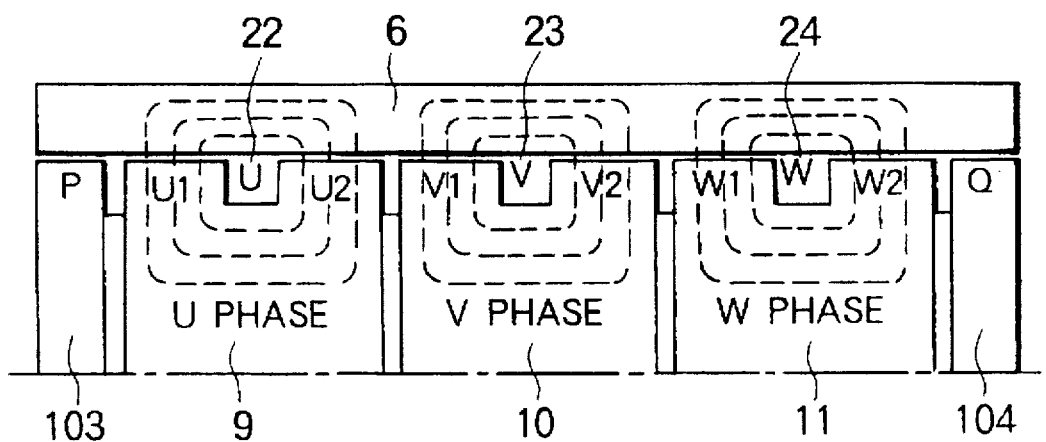
FIG. 5 is an explanatory diagram showing the flows of the magnetic fluxes generated by the coils.

The operation of the motor is now discussed. FIG. 4 shows the flows of magnetic fluxes through the flat magnets 8 and sub flat magnets 101, 102, and FIG. 4 also shows that the flows of magnetic fluxes are equalized by the sub magnetic plates 103, 104. If the sub flat magnets 101, 102 and the sub magnetic plates 103, 104 are not used, the magnetic fluxes generated by the two flat magnets 8 concentrate in the phase V stator yoke 10, and the flux in the phase V stator yoke 10 is (two times) stronger than that in the phase U or phase W stators, destroying the uniformity within each phase. As a result, this renders the motor unusable, and thus the function of the sub flat magnets and sub magnetic plates is important. Because of these, the magnetic fluxes are made uniform at their stronger level. The sub flat magnets assure uniformity in flux between phases. FIG. 5 shows the magnetic fluxes generated by the coils 22, 23, and 24 of phases U, V, and W, and the directions of the magnetic fluxes are determined by the directions of the currents flowing through the coils 22, 23, 24, respectively.

Figure 6:
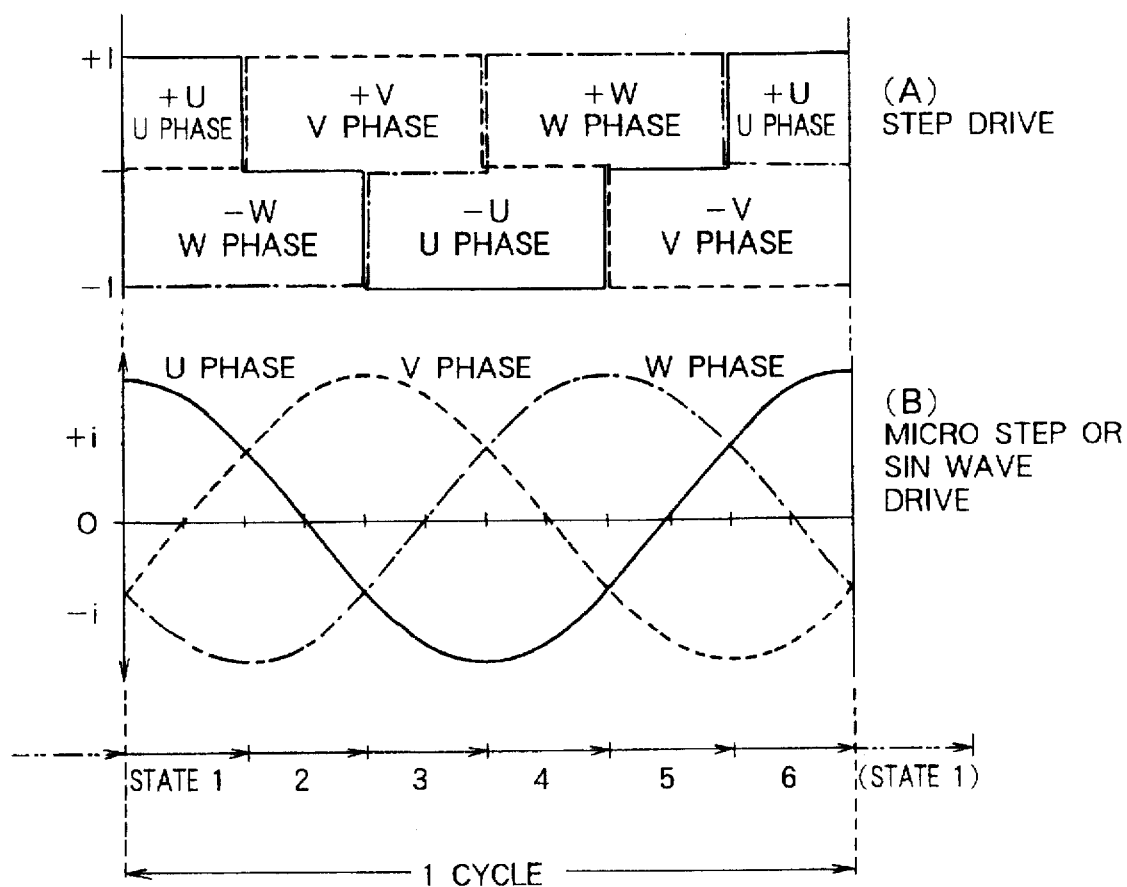
FIG. 6 is an explanatory diagram showing (A) step driving and (B) micro-step driving or sine-wave driving.

FIG. 6 specifically shows how each of the coils 22, 23, 24 is current driven, and FIG. 6(A) shows the step driving in which the strength of driving current I is not varied, but switched on and off. FIG. 6(B) shows the prior art micro-step driving or sine-wave driving, in which the strength of current I is gradually varied. In either case, one full cycle is divided into 6 states (state 1 through state 6), which are explained with reference to FIG. 7.

Figure 7:
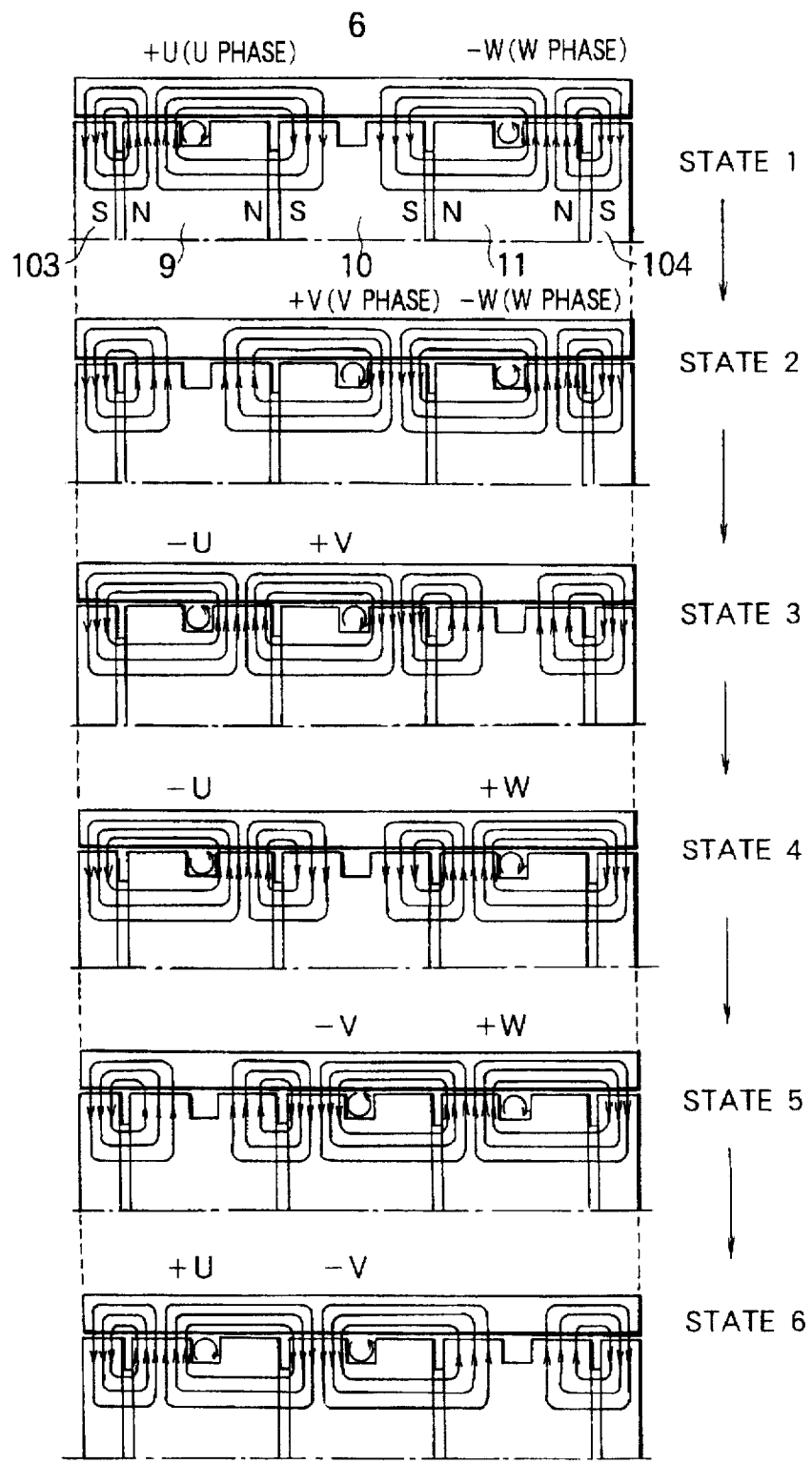
FIG. 7 is an explanatory diagram showing the combined magnetic flux at each state caused by the flat magnets and coils when currents flow the coils.

In FIG. 7, as in the prior art, magnetic fluxes generated by the flat magnets 8, sub flat magnets 101, 102 and currents at each Of the states 1 through 6 are combined when the step driving in FIG. 6(A) or micro-step or sine-wave driving in FIG. 6(B) is performed.

In this case, again, the sub magnetic plates 103, 104 and sub flat magnets 101, 102 function effectively and regularly in distributing of the combined magnetic fluxes.

Figure 8:
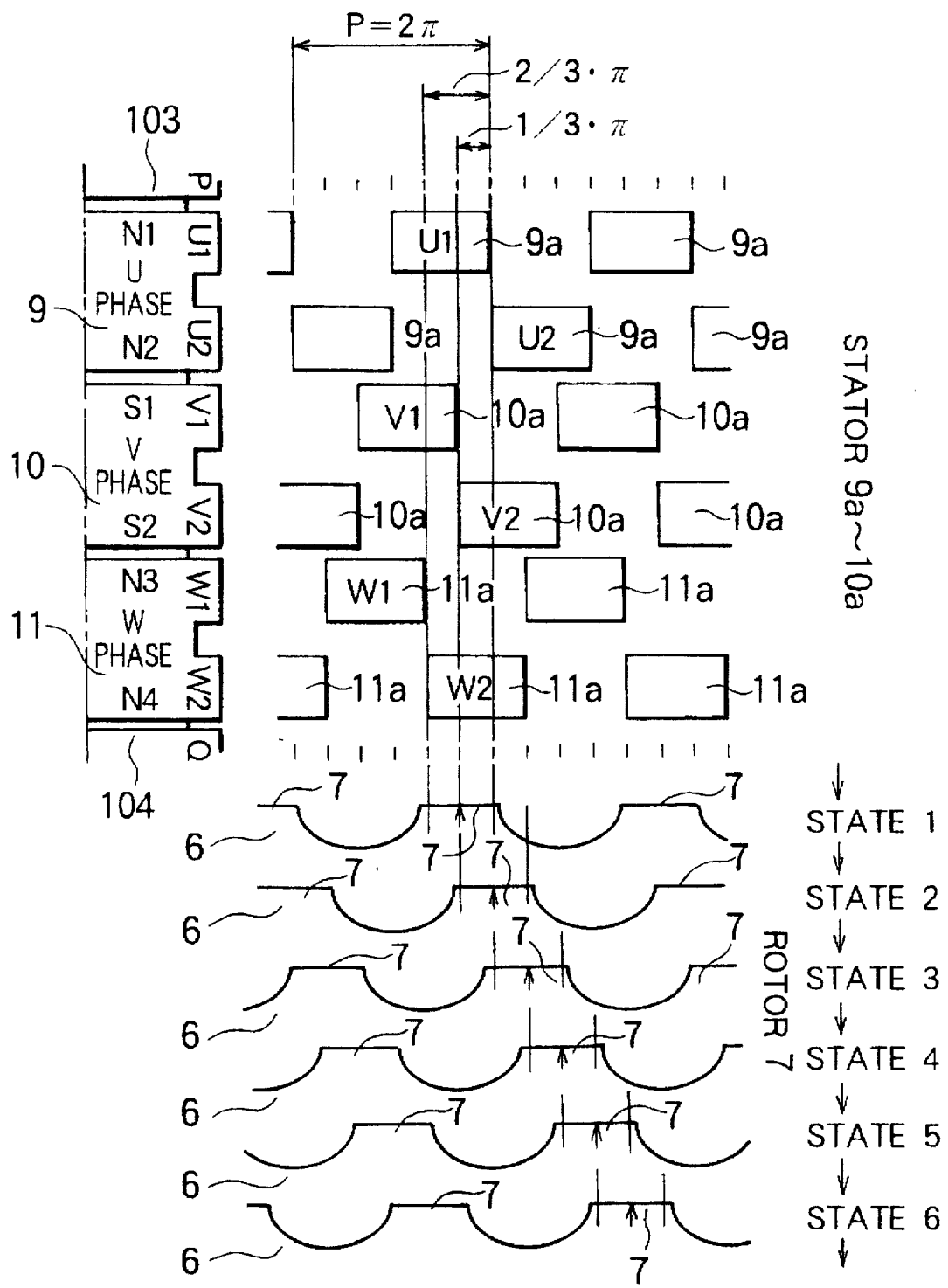
FIG. 8 is an explanatory diagram showing how the rotor teeth are positioned with respect to the stator teeth with reference to FIG. 7.

FIG. 8 shows the relative position of the rotor teeth 7 with respect to each of the stator teeth 9a, 10a, and 11a corresponding to FIG. 7, and the rotor teeth 7 move sequentially in response to the states 1 through 6. The three-phase motor thus functions as a motor by means of the sub magnetic plates 103, 104 and the sub flat magnets 101, 102 attached to both ends of the stator yoke body 100.

Figure 9:
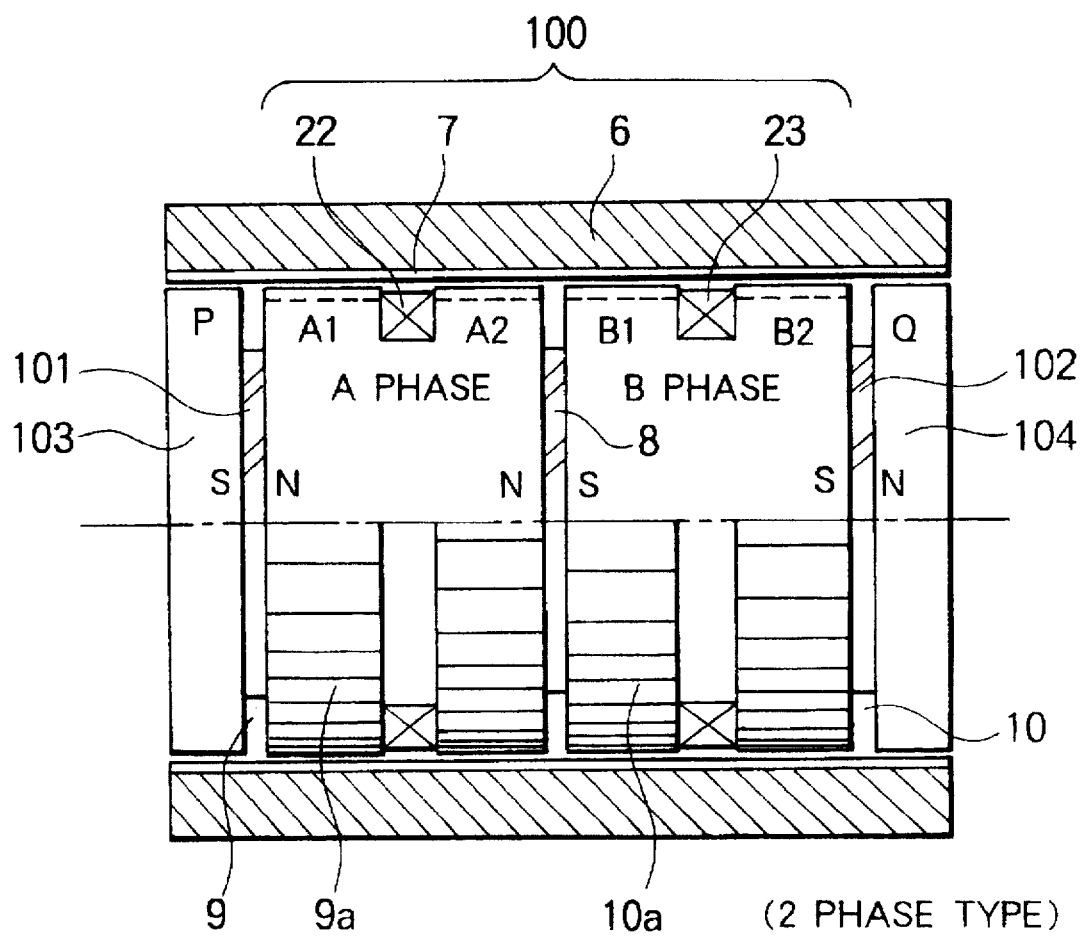
FIG. 9 is a diagram showing the two-phase version of the structure in FIG. 2.

FIG. 9 shows a two-phase arrangement in which the structure in FIG. 2 is implemented.

In the stator yokes 9, 10, teeth A1 and A2 are shifted off with each other by a ½ pitch, and teeth B1 and B2 are shifted off with each other by a ½ pitch, and the phases A and B of stator yokes 9, 10 are shifted off by a ½n pitch, namely a ¼ pitch. In case of the two phase, the motor functions at any rate without the sub flat magnets 101, 102 and the sub magnetic plates 103, 104. If they are used as shown the present invention in FIG. 9, however, the stator yokes 9 and 10 are excited more strongly and uniformly from both sides, a stronger torque results and irregularity in torque generation is controlled.

Figure 10:
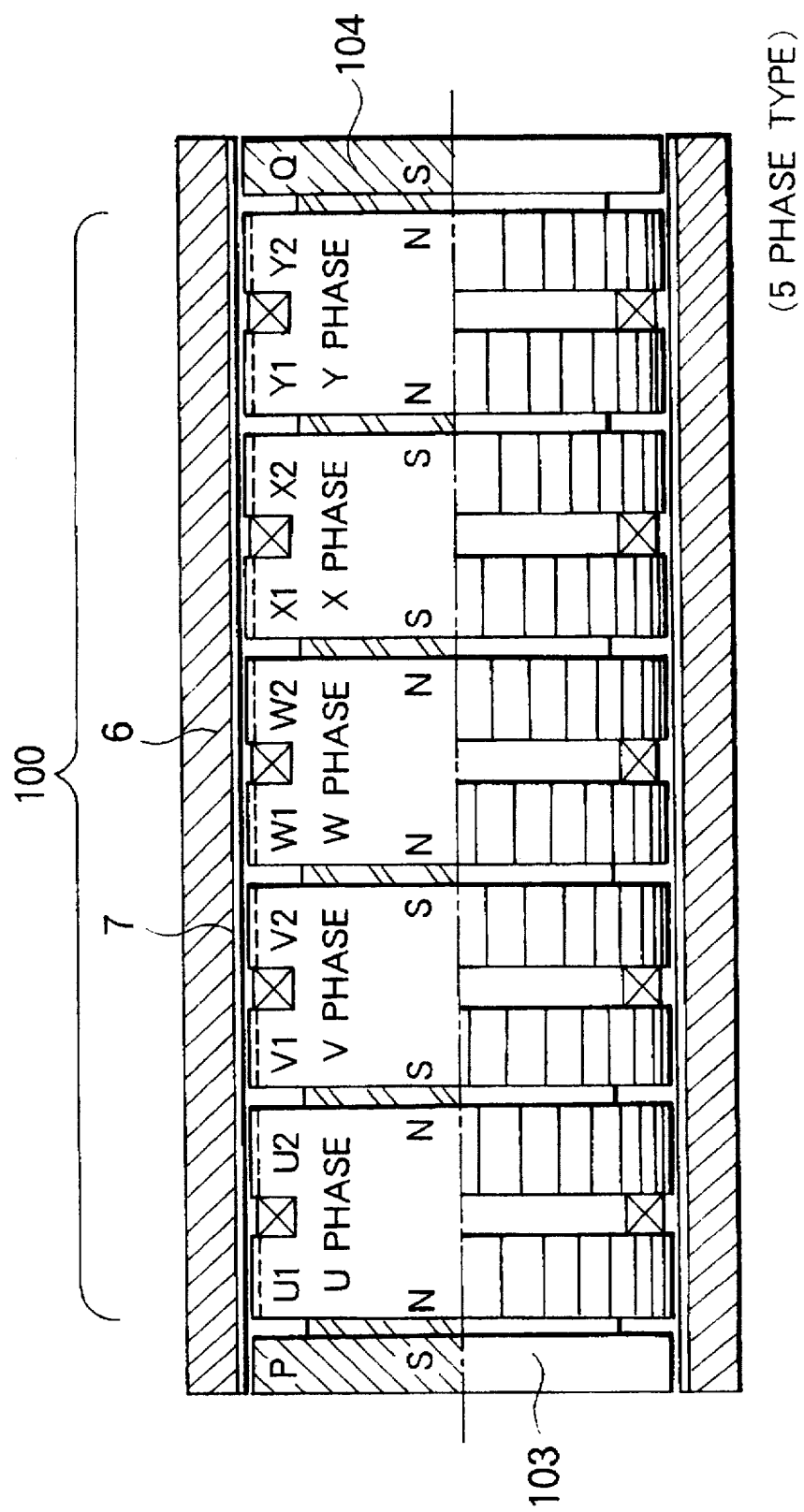
FIG. 10 is a diagram showing the five-phase version of the structure in FIG. 2.

FIG. 10 shows a five-phase motor in which the present invention is embodied, wherein there is a ½ pitch shift between the poles U1 and U2 of phase U, between the poles V1 and V2 of phase V, between the poles W1 and W2 of phase W, between the poles X1 and X2 of phase X, and between the poles Y1 and Y2 of phase Y, and an inter-phase shifting is ½n=¹/₁₀ (n=5).

As shown in the structures in FIG. 2 through FIG. 10, any motor from two-phase to three-phase to n-phase motor, regardless of whether it is an odd-phase motor or an even-phase motor, can be constructed.

Figure 11:
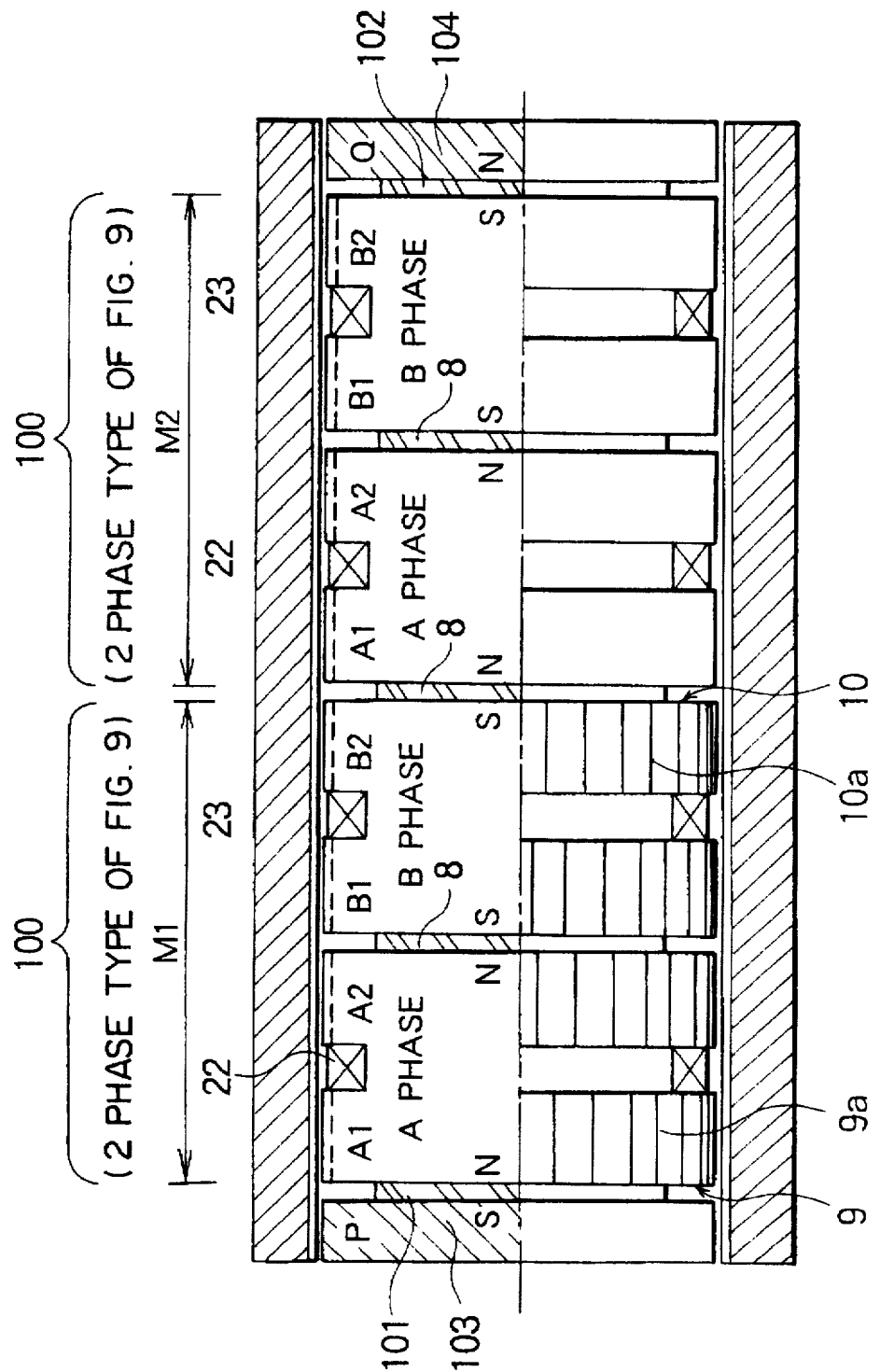
FIG. 11 is a diagram showing two two-phase motors cascaded having two stator yoke bodies of FIG. 9.

FIG. 11 shows two two-phase motors of FIG. 9 in which the two two-phase motors (M1 and M2) are serially cascaded. M1 and M2 in FIG. 11 employ two stator yoke bodies 100 of FIG. 9 with a flat magnet 8 interposed therebetween, and the sub flat magnets 101, 102 and the sub magnetic plates 103, 104 are mounted on both ends in the same way as in FIG. 9. Therefore, by cascading a plurality of stator yoke bodies 100, for example, N stator yoke bodies, a cascaded outer rotor or inner rotor hybrid-stepping motor having an arbitrary number N pieces of stator yoke bodies 100 is constructed. Unlike the case of two independent motors M1 and M2 arranged on the same shaft, in this case, again, the flat magnet 8 between M1 and M2, the sub flat magnets 101, 102 and the sub magnetic plates 103, 104 work advantageously in the same way as in the structure in FIG. 2.

Although FIG. 11 shows the two-phase motor of FIG. 9, the same principle is obviously applied to FIG. 2, FIG. 10 and further FIG. 12 to be described later. Generally speaking, N pieces of n-phase motors may be cascaded to result in a larger required torque.

Figure 12:
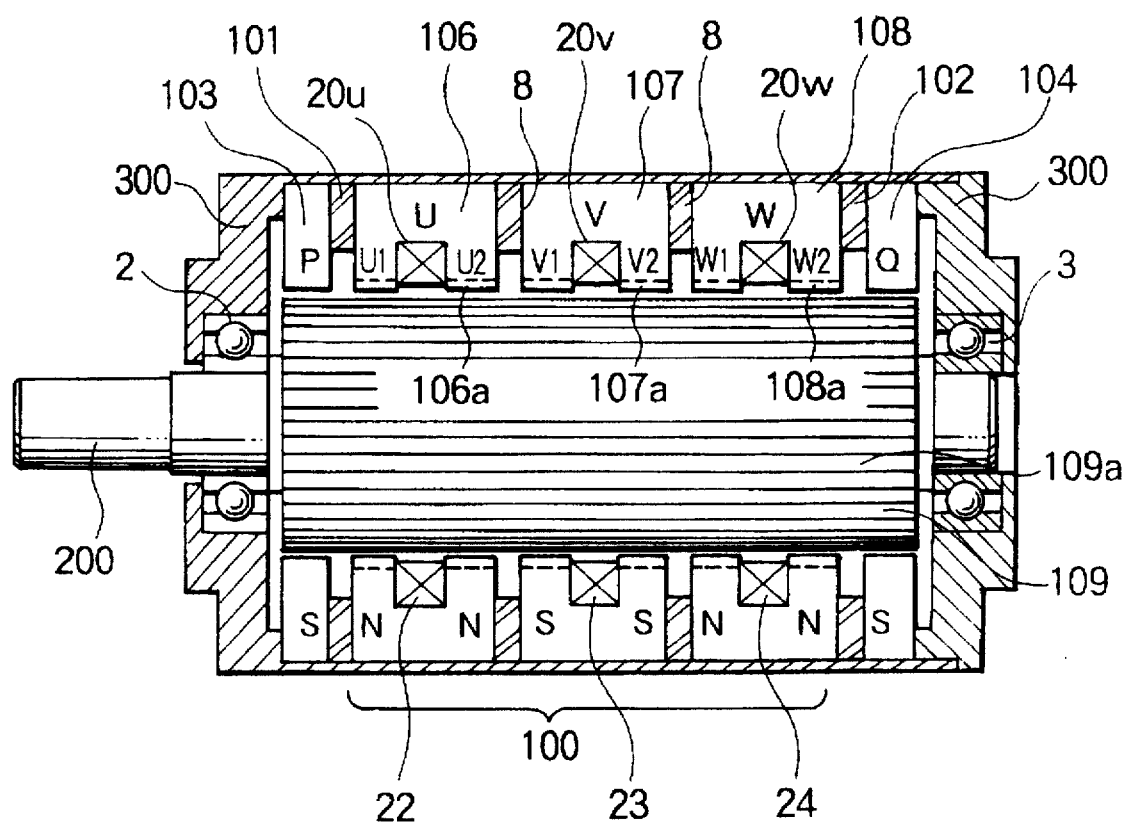
FIG. 12 is a diagram showing the structure of the inner rotor type of FIG. 2.

FIG. 12 shows an inner rotor hybrid-type stepping motor in which the present invention is implemented in the inner rotor structured hybrid-type stepping motor in FIG. 1, wherein on the inner circumference of a stator case 300 of a non-magnetic material, first, second and third ring-shaped stator yokes 106, 107, and 108 side by side with ring-shaped flat magnets 8 therebetween in the direction of the shaft are arranged in a unitary body to form a three-phase stator yoke body 100, and the stator yokes 106, 107 and 108 alternate in polarity.

The sub flat magnets 101, 102 and sub magnetic plates 103, 104 are arranged on both sides of the stator yoke body 100 to form magnetic circuits on both sides. The coil slots 20u, 20v, and 20w of the ring-shaped stator yokes 106, 107, and 108 have respectively first, second and third coils 22, 23, 24, each wound in a solenoid fashion, and a rotary shaft 200 of a magnetic material has rotor yokes 109 corresponding to each of the stator yokes 106, 107 and 108, and the rotor yoke 109 has, on its circumference, a plurality of teeth 109a. The structure in FIG. 12 is an inner rotor type, which is in contrast to FIG. 2, and its step driving is based on the same principle of the operation shown in FIG. 4 through FIG. 8.

In the same manner as in FIG. 9 and FIG. 11, a two-phase inner rotor version and a five-phase inner rotor version of the structure of FIG. 12 can be constructed, and more generally, an n-phase inner rotor hybrid-type motor can be constructed.

As two of the structures in FIG. 9 are cascaded as shown in FIG. 11, N pieces of n-phase inner rotor hybrid-type motors are cascaded in the same manner as in FIG. 11. Although the above discussion assumes that each of the coils 22, 23 is of a bipolar winding of the prior art, the prior art unipolar winding offers equally advantageous effect. Although the above embodiments are based on the prior art single phase excitation, the motor may be driven in two-phase excitation or single-two-phase excitation. Shifting in pitch in each of the teeth 7, 9a, 10a, 11a, and 109a is a relative value, and the same operation is performed if any teeth are shifted relative to the other. The motor may be configured in any convenient shape, for example, in a flat large-diameter structure, a thin structure, or a fine elongated structure.

The hybrid-type stepping motor thus constructed of the present invention offers the following advantages. Since in the structure in FIG. 2, the coils are mounted on the outer circumferences of the stator yokes, the coil winding operation is extremely easy, substantially reducing the cost of this type of outer rotor hybrid-type stepping motor. In the structure in FIG. 12, coils wound in a solenoid fashion are inserted from inside the stator yokes, and its manufacturing cost is substantially low compared to the prior art. Furthermore, since the sub flat magnets as magnetic flux paths are provided on both sides of the motor, magnetic poles are formed at both magnet sides, easily achieving a larger torque, and an n-phase stepping motor is easily constructed as necessary.

For the n-phase, the stator yokes are simply shifted off by a ½n pitch, and identical stator yokes and rotor yokes are used for 2 to n-phase. An outer rotor or inner rotor hybrid-type stepping motor having N pieces of stator yoke bodies may be constructed.

What is claimed is:

1. A hybrid-type stepping motor having an outer rotor structure comprising a pair of bearings spaced apart and mounted on a fixed shaft, a rotor case rotatably supported by the bearings, a ring-shaped rotor yoke, mounted on the rotor case and having a plurality of rotor teeth, a stator yoke body made up of n stator yokes arranged side by side with flat magnets interposed therebetween on the fixed shaft along the direction of the fixed shaft, a plurality of stator teeth formed on the circumferences of the stator yokes, n axially centered circular coil slots formed on the circumferences of the stator yokes, n coils seated in the circular coil slots, wherein n is an integer greater than one, a pair of sub magnetic plates mounted to the fixed shaft such that the stator yoke body is interposed between the sub magnetic plates, and a pair of sub flat magnets interposed between the sub magnetic plates and the stator yoke body, whereby the stator yokes alternate in magnetic polarity and magnetic flux flows from the sub flat magnets to the sub magnetic plates.

2. The hybrid-type stepping motor according to claim 1, comprising three stator yokes for three-phase driving.

3. The hybrid-type stepping motor according to claim 1, comprising two stator yokes for two-phase driving.

4. A hybrid-type stepping motor having an inner rotor structure comprising a pair of bearings mounted on both ends of a casing, a rotary shaft rotatably supported by the bearings, a stator yoke body made up of n ring-shaped stator yokes arranged side by side with ring-shaped flat magnets interposed therebetween in the inner circumference of the casing along the direction of the rotary shaft, a plurality of stator teeth formed on the inner circumferences of the ring-shaped stator yokes, a pair of sub flat magnets mounted inside the casing such that the stator yoke body is interposed between the sub flat magnets, a pair of sub magnetic plates mounted inside the casing such that the sub flat magnets are interposed between the sub magnetic plates, n axially centered circular coil slots formed on the inner circumferences of the ring-shaped stator yokes, n coils seated in the circular coil slots, wherein n is an integer greater than one, a rotor yoke mounted on the rotary shaft corresponding to the stator yokes, and a plurality of rotor teeth provided on the circumference of the rotor yoke, whereby magnetic flux flows from the sub flat magnets to the sub magnetic plates.

5. The hybrid-type stepping motor according to claim 4, comprising three stator yokes for three-phase driving.

6. The hybrid-type stepping motor according to claim 4, comprising two stator yokes for two-phase driving.

7. The hybrid-type stepping motor having an outer rotor structure according to claim 1, wherein a plurality of stator yoke bodies with the flat magnets interposed therebetween are cascaded.

8. The hybrid-type stepping motor having an inner rotor structure according to claim 4, wherein a plurality of stator yoke bodies with the flat magnets interposed therebetween are cascaded.

* * * * *